United States Patent [19]

Okamura et al.

[11] Patent Number: 5,234,516

[45] Date of Patent: Aug. 10, 1993

[54] METHOD FOR PRODUCTION OF A POLYETHYLENE LAMINATED METAL SHEET

[75] Inventors: Takaaki Okamura, Yanai; Atsuo Tanaka; Tsuneo Inui, both of Tokuyama; Akio Miyachi, Kudamatsu, all of Japan

[73] Assignee: Toyo Kohan Co., Ltd., Tokyo, Japan

[21] Appl. No.: 898,469

[22] Filed: Jun. 15, 1992

[51] Int. Cl.⁵ ............................................. B32B 31/28
[52] U.S. Cl. ................................ 156/82; 156/244.17; 156/244.24; 156/272.2; 156/308.8; 156/309.3; 156/82; 72/46
[58] Field of Search ...................... 156/244.17, 244.24, 156/272.2, 308.8, 309.3, 82; 427/46, 226, 372.2, 405, 419.2; 72/46; 220/456, 458

[56] References Cited

U.S. PATENT DOCUMENTS

| | | | |
|---|---|---|---|
| 3,697,513 | 7/1972 | Addinall et al. | 156/308.8 |
| 4,452,374 | 6/1984 | Hitchcock et al. | 72/46 |
| 4,945,008 | 7/1990 | Heyes et al. | 156/272.2 |
| 4,957,820 | 9/1990 | Heyes et al. | 156/308.2 |

*Primary Examiner*—Caleb Weston
*Attorney, Agent, or Firm*—Felfe & Lynch

[57] ABSTRACT

A polyethylene film is heat bonded to a metal sheet provided with a layer of hydrated chromium oxide, and possibly a layer of metallic chromium under the oxide layer. The laminated metal sheet is then rapidly quenched, and the polyethylene laminate is irradiated with an electron beam, gamma rays, or X-rays. Alternatively, the polyethylene film may be irradiated prior to lamination. The laminated metal sheet exhibits excellent resistance to steam and hot water and does not delaminate during forming operations such as can-making.

29 Claims, No Drawings

METHOD FOR PRODUCTION OF A POLYETHYLENE LAMINATED METAL SHEET

FIELD OF THE INVENTION

The present invention relates to a method for producing a polyethylene laminated metal sheet having an excellent resistance to hot steam and hot water which comprises laminating by heat bonding a polyethylene film wherein a radioactive ray has been irradiated on one or both sides of a metal sheet covered with a single layer of hydrated chromium oxide or a double layer consisting of a lower layer of metallic chromium and an upper layer of hydrated chromium oxide, and then rapidly quenching or irradiating a radioactive ray on a polyethylene laminated metal sheet after lamination of polyethylene and then rapidly quenching.

BACKGROUND OF THE INVENTION

At present, a metal sheet such as electrotinplate, tin free steel (TFS) and aluminum are widely used for can stock after coating with lacquer one or several times. The lacquer coating is disadvantageous from the standpoint of energy cost because a long time is required for curing the lacquer and a large volume of solvent discharged during lacquer curing must be burned in another furnace in order to prevent air pollution.

Recently, the lamination of thermoplastic resin film on a metal sheet was attempted in order to avoid these problems. For example, the methods shown in U.S. Pat. No. 3,679,513, Japanese Patent Publication No. Sho 60-47103, Laid-Open Japanese Patent Application No. Hei 3-212433, Japanese Patent Publication No. Sho 63-13829 and U.S. Pat. No. 4,957,820 are already known.

U.S. Pat. No. 3,679,513 relates to a method for lamination of a polyethylene film on a steel sheet covered with double layer consisting of a lower layer of metallic chromium and an upper layer of hydrated chromium oxide; namely TFS, which has been heated to above the melting temperature of the polyethylene film and thereafter immediately quenching the laminate. However, when the polyethylene film laminated metal sheet according to this patent is treated by hot steam at 100° to 130° C. in a retort, the surface of the laminated polyethylene film is partially melted by contacting with hot steam and hot water. As the result, the appearance of the laminate becomes poor. Therefore, the laminate according to this patent is not suitable for the outside of the food cans treated with hot steam in a retort for sterilization after packing food such as coffee drink, meat or fish, although the employed polyethylene film is cheaper than the polyester resin film described below. Japanese Patent Publication No. Sho 60-47103 relates to a process for lamination of a crystalline polyester resin film to a metal sheet heated to above the melting temperature of the polyester resin film and thereafter immediately quenching the laminate. In this patent, the crystalline polyester resin film is sufficiently adhered to the metal sheet by an amorphous non-oriented polyester resin layer which is formed at the interface of the crystalline polyester resin film and the metal sheet as a result of the heating step. However, when the polyester resin film laminated metal sheet according to this patent is treated by hot steam and hot water at 100° to 130° C. in a retort, the surface of the polyester resin film laminated metal sheet becomes milky. Especially, the part of the surface of the polyester resin film laminated metal sheet, where the hot water droplets accumulate, becomes noticeably milky. The reason for the discoloration of the surface appearance described above is due to the recrystallization of the amorphous non-oriented polyester resin layer by contact with hot steam and hot water. Therefore, the laminate according to this patent is not suitable for the outside of the can treated with hot steam in a retort for the sterilization of the packed foods.

The method according to Laid-Open Japanese Patent Application No. Hei 3-212433 is characterized by laminating a copolyester resin film having specified characteristics at a temperature below the melting temperature and above the softening temperature of the copolyester resin film in order to decrease the amount of the amorphous non-oriented copolyester resin layer formed as a result of heating step during lamination which causes the milky change during retort treatment as described above.

A small amount of the amorphous non-oriented copolyester layer is inevitably formed between the surface of the metal sheet and the biaxially oriented copolyester resin layer. If the amorphous non-oriented layer is not formed at al, the laminated biaxially oriented copolyester resin film will not adhere to the metal sheet. Thus, if the milky change is eliminated, the laminated copolyester resin film may peel off during forming operations, because the amorphous non-oriented copolyester resin layer is scant and non-uniform.

According to JPA Hei 3-212433, then, it is very difficult to obtain a metal sheet laminated with copolyester resin film which exhibits good adhesion and formability and does not exhibit a milky change during retort treatment. Furthermore, the biaxially oriented copolyester resin film sued int his patent is expensive compared with the polyethylene film used int eh present invention.

The surface of the polyester resin film laminated metal sheet according to Japanese Patent Publication No. Sho 63-13829 does not become milky by contact with hot steam and hot water in a retort, because an amorphous non-oriented polyester resin layer is almost not present as a result of lamination at a temperature below the melting temperature of the polyester resin film. However, the coating and curing of the specified adhesive precoated to the polyester resin film which is indispensable in this patent is disadvantageous from the standpoints of the material cost and the treatment of a large volume of solvent discharged during lacquer curing for the prevention of air pollution.

U.S. Pat. Nos. 4,957,820, 3,679,513 relates to a laminate wherein one side of a metal sheet is laminated with a composite polyester resin film consisting of an inner layer of non-crystalline polyester and an outer of a linear polyester, preferably biaxially oriented polyester and the other side of a metal sheet is laminated with a polyolefin-containing film comprising a bonding resin which is an acid modified polyolefin resin containing carboxyl or anhydride group. If the polyester resin film laminated side in the laminate according to this patent is used for the outside of the can treated with hot steam and hot water in a retort after packing foods, the surface of the laminated polyester resin film changes to milky by a retort treatment, because the amorphous non-oriented (non-crystalline) polyester resin layer which constitutes an inner layer in the laminated polyester resin film is recrystallized by a retort treatment as same as that in Japanese Patent Publication No. Sho 60-47103. Furthermore, if the polyolefin resin film laminated side in the laminate according to this patent is also used for the outside of the can treated with hot steam and hot water in a retort, the surface of the laminate may not change by a retort treatment. However, the polyolefin film must contain a special bonding resin. Therefore, the laminate according to this patent is not suitable for the outside of the can treated with hot steam in a retort from the standpoints of the production costs of the polyolefin film and the polyester resin film and the resistance to hot steam and hot water.

OBJECTIVES

Accordingly, it is a first objective of the present invention to provide a polyethylene laminated metal sheet having an excellent resistance to hot steam and hot water in a retort wherein the laminated polyethylene film is not peeled off from the surface of the metal sheet when forming can ends and a drawn can body and the surface appearance does not change after treatment by hot steam and hot water in a retort. It would thus be possible to supply the cheaper can stock for the outside of cans treated with hot steam and hot water in a retort after packing foods.

It is the second objective of the present invention to provide a method for the continuous lamination of a polyethylene irradiated by a radioactive ray before or after the lamination to a metal sheet or strip.

SUMMARY OF THE INVENTION

The objectives of the present invention can be accomplished by the lamination of a polyethylene film wherein a radioactive ray is irradiated before or after lamination on one or both sides of a metal sheet or strip covered with a single layer of hydrated chromium oxide or a double layer consisting of a lower layer of metallic chromium and upper layer of hydrated chromium oxide which has been heated to a temperature above the melting temperature of the polyethylene. Namely, the present invention is characterized by the following factors:

(1) The use of a metal sheet covered with a single layer of hydrated chromium oxide or a double layer consisting of a lower layer of metallic chromium and an upper layer of hydrated chromium oxide.

(2) The heat bonding of a polyethylene film to the metal sheet at a temperature above the melting temperature of the polyethylene.

(3) The irradiation of the polyethylene film by a radioactive ray before or after lamination.

Excellent resistance to hot steam and hot water and adhesion of laminated polyethylene to the metal sheet can be obtained by controlling all of the factors described above in some optimum ranges.

The polyethylene laminated metal sheet according to the present invention can be used for the outside of cans treated in a retort after packing foods wherein excellent resistance to hot steam and hot water and excellent adhesion to the metal sheet after forming are required, such as the outsides of can ends, deeply drawn cans, drawn and redrawn cans and screwed caps. However, the laminate according to the present invention can not be used in applications wherein color printing or lacquer coating is carried out on the laminate because the laminated polyethylene is partially melted by heating at about 200° C. for 10 to 30 minutes in order to cure the lacquer and printing ink.

DETAILED DESCRIPTION OF THE PREFERRED EMBODIMENT

In the present invention, a polyethylene having 70 to 100 mole % of ethylene units is used. Especially, although a low density polyethylene, a medium density polyethylene, a high density polyethylene or the blend of these polyethylenes which is widely used for the packaging material is preferable, a polyethylene containing an ionomer which is an ionic salt such as sodium, potassium, zinc, magnesium, calcium and aluminum of $\alpha$, $\beta$-unsaturated carboxylic acid such as metacryl acid, acryl acid and maleic acid, a polyethylene modified by maleic acid and acryl acid and a polyethylene copolymerized with other polyolefin resin such as polypropylene can be also used for the present invention. However, if the ethylene unit is below 70 mole % in the employed polyethylene, namely other components described above are above 30 mole %, the resistance to hot steam and hot water of the polyethylene laminated metal sheet is not improved, because the chemical cross-linking of the polyethylene is not preceded by the irradiation with the radioactive ray described below. Furthermore, the addition of the large amount of these components is not preferable from an economic standpoint, although the adhesion of the laminated polyethylene to the metal sheet may be improved. Therefore, the amount of these components in polyethylene should be decided in consideration of the obtained effect and the film cost. The formability of the laminated polyethylene is one of the important factors in the present invention. It is preferable to use a polyethylene having above 80% in the elongation at break from the standpoint of the formability of the laminated polyethylene film in the present invention.

In some cases, additives such as antioxidants, stabilizers, pigments, antistatic agents, lubricants and corrosion inhibitors can be added during the manufacturing process of the polyethylene used for the present invention.

Furthermore, it is preferable to carry out an oxidation treatment on the surface of the polyethylene film contacted with the metal sheet, such as a corona discharge treatment, a plasma treatment or a flame treatment, in order to improve the adhesion of the laminated polyethylene film to the metal sheet after forming. Especially, when a tinplated steel or a nickel plated steel sheet which is inferior to TFS in the adhesion of the laminated polyethylene film can be used as the base metal sheet for the lamination of a polyethylene film, it is preferable to use the polyethylene film treated by a method described above. The effect of the oxidation treatment to the employed polyethylene film is represented by a wetting index which is measured by JIS K6768-1977. If the wetting index in the employed polyethylene film is below 38 dyne, the adhesion to the metal sheet is not improved. Furthermore, it is not preferable that the wetting index in the employed polyethylene film becomes above 54 dyne by the oxidation treatment because the adhesion to the metal sheet is not improved and the polyethylene film may be coloured. Therefore, the wetting index of the employed polyethylene film by the oxidation treatment should be controlled to the range of 38 to 54 dyne.

The thickness of the polyethylene film used in the present invention should be 7 to 250 $\mu$m. If the thickness of the employed polyethylene film is below 7 $\mu$m, good corrosion resistance after forming of the laminate is not obtained and the continuous lamination of thin polyethylene film to the metal sheet becomes noticeably difficult. The use of polyethylene film having a thickness above 250 μm is not economically suitable for the film to be laminated on the metal sheet. Furthermore, the adhesion of the laminated polyethylene film on the metal sheet becomes poor in above 250 μm of the thickness of the employed polyethylene film.

The amount of irradiation by a radioactive ray such as an electron beam, gamma-ray and X-ray to the polyethylene before or after lamination to the metal sheet, which is one of the important factors in the present invention, should be controlled to the range of about 1 to about 25 kilocoulomb/kilogram (Kc/Kg), more preferably about 2 to about 20 Kc/Kg. If the amount of irradiation by the radioactive ray to the polyethylene is below about 1 Kc/Kg, the resistance to hot steam and hot water of the polyethylene laminated metal sheet is not improved and the laminated polyethylene is partially melted by a retort treatment because the chemical cross-linking of the polyethylene does not almost proceed. Furthermore, even if the amount in the irradiation of the radioactive ray to the polyethylene is above about 25 Kc/Kg, the increase in the effect by the irradiation of the radioactive ray is not observed and is also economically disadvantageous.

The effect of the irradiation by the radioactive ray on the polyethylene before lamination to the metal sheet decreases slightly by heating during the lamination of the polyethylene film to the metal sheet. Therefore if the irradiation of the polyethylene film by the radioactive ray is carrier out before lamination of the metal sheet, it is preferable to increase the amount of irradiation of the polyethylene film compared with that after lamination.

Furthermore, the intensity of the radioactive ray should be decided from the production speed of the laminate according to the present invention and the economical standpoint, although it is not specially limited.

In the present invention, the employed metal sheet should be selected from the group of steel sheet, tin plated steel sheet, nickel plated steel sheet and aluminum sheet which is covered with a single layer of hydrated chromium oxide or a double layer consisting of a lower layer of metallic chromium and an upper layer of hydrated chromium oxide.

The amount of plated tin and plated nickel in the metal sheet should be below 5.6 g/m$^2$ and 3.0 g/m$^2$ respectively, for reasons of economy. If the amounts of plated tin and plated nickel are below 0.05 g/m$^2$, the effect of plated tin and nickel on the characteristics, for example a corrosion resistance to the packed food, is hardly apparent, despite the addition of a further plating process.

It is one of the important factors in the present invention that the employed metal sheet is covered with a single layer of hydrated chromium oxide or a double layer consisting of a lower layer of metallic chromium and an upper layer of hydrated chromium oxide in order to obtain an excellent adhesion of the laminated polyethylene to the metal sheet after forming to can ends and deep drawn cans.

The optimum amount of hydrated chromium oxide as chromium is 5 to 25 mg/m$^2$ in the single layer or the double layer. The optimum amount of metallic chromium in the double layer is 10 to 150 mg/m$^2$. If the amount of hydrated chromium oxide as chromium is below 5 mg/m$^2$ or above 25 mg/m$^2$, the adhesion of the laminated polyethylene to the metal sheet may become poor after forming even if the amount of metallic chromium is 10 to 150 mg/m$^2$, when the polyethylene laminated metal sheet is exposed to hot steam and hot water in a retort. It is preferable that the deposition of metallic chromium improves the adhesion of the laminated polyethylene to the metal sheet and the corrosion resistance of the obtained laminate. However, the deposition of metallic chromium above 150 mg/m$^2$ is unnecessary in the present invention, because the corrosion resistance of the obtained laminate and the adhesion of polyethylene do not almost change, even if metallic chromium above 150 mg/m$^2$ is deposited.

In the lamination of the polyethylene film on both sides of the metal sheet, it is preferable to laminate the polyethylene film on both sides of the metal sheet simultaneously, although the lamination of the polyethylene film in order on each side of the metal sheet is possible.

The temperature of the metal sheet just before the lamination of the polyethylene film, which is also one of the important factors in the present invention, should be maintained in the range of Tm to Tm+240° C. where Tm represents the melting temperature of the employed polyethylene film. If the temperature is below Tm, the polyethylene film does not sufficiently adhere to the metal sheet, because the surface contacted with the heated metal sheet of the polyethylene film is not melted. Furthermore, if the temperature of the metal sheet is above Tm+240° C., the stable and continuous production of the polyethylene laminated metal sheet becomes difficult, because the outermost layer of the laminated polyethylene film may be melted by the high speed transmission of the heat from the inner layer to the outer layer of the laminated polyethylene film, even if the surface temperature of a pair of the laminating rolls is cooled to a temperature below the melting temperature of the polyethylene film.

On the other hand, it is preferable that the inside of the can contacting a corrosive food is covered with a biaxially oriented polyester resin film having an excellent barrier ability against food compared with that of a polyethylene film and the outside of the can wherein an excellent resistance to hot steam and hot water is required is covered with a polyethylene. Especially, when an excellent corrosion resistance after severe forming is required, it is preferable that the side of the metal sheet used for the inside of the can is laminated with a biaxially oriented copolyester consisting of mainly polyethylene terephthalate containing polybutylene terephthalate or polyethylene isophthalate having an excellent formability as compared with only polyethylene terephthalate film. It is indispensable in the lamination of the biaxially oriented copolyester resin film that the optimum amount of the amorphous non-oriented copolyester layer is formed at the interface of the metal sheet and the biaxially oriented copolyester resin film as a result of heating step during lamination in order to obtain an excellent adhesion of said biaxially oriented copolyester resin film to the metal sheet.

In this case, the metal sheet should be heated to a temperature above the melting temperatures of the polyester resin film and the polyethylene film. Concretely, the temperature of the metal sheet should be controlled to the range of T to T+160° C. and Tm to Tm+240° C., where T represents the melting temperature of the polyester resin film and Tm represents that of the polyethylene film. Although T and Tm changes by the amount of other component added to a polyethylene terephthalate and a polyethylene, respectively. Practically, T is about 220° to about 260° C. and Tm is about 115° to about 145° C. Furthermore, the temperatures of a pair of laminating roll should be controlled to a temperature below each melting temperature. When the temperature of each laminating roll is above the melting temperature, the laminate having two kinds of resin film is not continuously produced at high speed, because the outer layer of the resin films is melted and is adhered to each laminating roll.

If the temperature of the metal sheet is below T, the polyester resin film does not sufficiently adhere to the metal sheet, although the polyethylene film is sufficiently adhered. If the temperature of the metal sheet is above T+160° C., the laminated biaxially oriented polyester resin film almost changes to an amorphous non-oriented film, because the heat of the metal sheet is rapidly transmitted from the inner layer of the laminated polyester resin film to the outer layer of its, even if the temperature of laminating roll contacted with said polyester resin film is maintained at a temperature below the melting temperature of the polyester resin film. As a result, the corrosion resistance to corrosive food in the polyester resin film laminated side becomes poor.

In the case of direct lamination of a melted polyethylene from an extruder to a metal sheet, it is preferable that the metal sheet is heated to a temperature in the range of Tm-50° C. to Tm+200° C. and the employed polyethylene is melted at Tm+20° to Tm+150° C. If the temperature of the heated metal sheet is below Tm-50° C., the surface of the laminated polyethylene becomes uneven, because the melted polyethylene does not easily flow. Even if the metal sheet is heated to above Tm+200° C., the adhesion of the laminated polyethylene to the metal sheet does not change. However, it is not economically suitable.

Furthermore, the polyethylene melted at a temperature below Tm+20° C. is not suitable for the production of the polyethylene laminated metal sheet because the viscosity of the melted polyethylene is high and does not flow easily to the surface of the metal sheet. The polyethylene melted at a temperature above Tm+150° C. is also not suitable, because the deterioration of the melted polyethylene may proceed.

In the present invention, the method for heating the metal sheet to which the polyethylene and the polyester resin film are laminated is not especially limited. However, from the standpoint of the continuous and stable production of the laminate at high speed, conduction heating by rolls heated by inducting heating, induction heating and/or resistance heating which are used for reflowing electroplated tin in the production process of electrotinplate is suitable as the method for heating the metal sheet, because the metal sheet can be rapidly heated and the temperature of the heated metal sheet can be easily controlled. Furthermore, it is also preferable in the present invention that heating with a roll heated by hot steam or heating in an electric oven can be used as an auxiliary method for preheating the metal sheet to be laminated.

The present invention is explained in further detail by the following examples.

EXAMPLE 1

A low density polyethylene film having a thickness of 40 μm (Trade name: AJ-1 made by Tamapoly Co. Ltd) was laminated by using a pair of rolls wherein the surface temperature of it was controlled to 80° C. at laminating speed of 60 m/min on one side of TFS strip having a thickness of 0.21 mm and a width of 250 mm (metallic chromium: 120 mg/m$^2$, hydrated chromium oxide: 18 mg/m$^2$ as chromium) which had been heated to 290° C. by using rolls heated by an induction heating, and thereafter was immediately quenched by water. After drying, 1.2 Kc/Kg of an electron beam was irradiated on the polyethylene laminated side of the laminate.

EXAMPLE 2

A linear low density polyethylene film having a thickness of 40 μm (Trade name: NB-I made by Tamapoly Co. Ltd.) and a biaxially oriented polyethylene terephthalate film having a thickness of 25 μm (Trade name: Lumirror S10 made by Toray Co. Ltd.) were laminated simultaneously by using a pair of rolls in which the surface temperature of the roll contacting the polyethylene film was controlled to 80° C. and the surface temperature of the roll contacting the polyethylene terephthalate film was controlled to 120° C. at the laminating speed of 60 m/min on each side of TFS strip having a thickness of 0.21 mm and a width of 250 mm (metallic chromium 105 mg/m$^2$, hydrated chromium oxide: 23 mg/m$^2$) which had been heated to 290° C. by using rolls heated by an induction heating. After quenching and drying, 23 Kc/Kg of an electron beam was irradiated on the polyethylene laminated side.

EXAMPLE 3

2 Kc/Kg of an electron beam was irradiated on the polyethylene laminated side of the laminate obtained by the same conditions as in Example 1, except that the employed TFS had hydrated chromium oxide of 7 mg/m$^2$ as chromium and metallic chromium of 95 mg/m$^2$.

EXAMPLE 4

5 Kc/Kg of an electron beam was irradiated to the same low density polyethylene film as in Example 1. After that, said polyethylene film was laminated on the same TFS strip as in Example 1 under the same conditions as in Example 1.

EXAMPLE 5

The polyethylene melted at 220° C. having the same composition as in Example 1 was laminated by the extrusion from T-die on the same TFS strip as in Example 1 which has been heated to 120° C. by an induction heating and then the laminate was immediately quenched into water. After drying the laminate, 10 Kc/Kg of an electron beam was irradiated on the laminate.

COMPARATIVE EXAMPLE 1

The same polyethylene film as in Example 1 was laminated on the same TFS strip as in Example 1 under the same conditions as in Example 1. After that, an electron beam was not irradiated on the laminate.

COMPARATIVE EXAMPLE 2

The same polyethylene film as in Example 1 was laminated on the same TFS strip as in Example 2 under the same conditions as in Example After drying 0.5 Kc/Kg of an electron beam was irradiated on the laminate.

COMPARATIVE EXAMPLE 3

The same polyethylene film as in Example 1 was laminated on TFS strip having hydrated chromium oxide of 28 mg/m$^2$ as chromium and metallic chromium of 90 mg/m$^2$ under the same conditions as in Example 1. After drying, 28 Kc/Kg of an electron beam was irradiated on the laminate.

COMPARATIVE EXAMPLE 4

The laminate was obtained by the same conditions as in Example 1, except the employed TFS strip had hydrated chromium oxide of 3 mg/m$^2$ as chromium and metallic chromium of 80 mg/m$^2$.

EXAMPLE 6

A cold rolled steel strip having a thickness of 0.21 mm and a width of 250 mm was electrolytically degreased in a solution of 70 g/l of sodium hydroxide and then pickled in a solution of 100 g/l of sulfuric acid. The steel strip, after rinsing with water, was electroplated with 1.5 g/m$^2$ of tin by using a tinplating electrolyte consisting of 80 g/l of stannous sulfate, 60 g/l of phenosulfonic acid (65% solution) and 0.06 g/l of ethoxylated α-naphthol in water under 20 A/dm$^2$ of cathodic current density at an electrolyte temperature of 45° C. After rinsing with water, TFS film consisting of a lower layer of metallic chromium of 95 mg/m$^2$ and an upper layer of hydrated chromium oxide of 13 mg/m$^2$ as chromium was formed by cathodically treatment on both sides of the tin plated steel strip by using an electrolyte consisting of 50 g/l of chromic acid and 0.5 g/l of sulfuric acid in water under 40 A/dm$^2$ of cathodic current density at an electrolyte temperature of 50° C. The thus treated tin plated steel strip was rinsed with hot water and dried.

After oxidized the side of the same low density polyethylene film as in Example 1 by corona discharge to 38 dyne in wetting index, the oxidized side of the polyethylene film was laminated to tin plated steel strip and then irradiated by an electron beam under the same conditions as in Example 1.

EXAMPLE 7

The laminate was obtained by the same conditions as in Example 6, except the employed polyethylene film was oxidized by corona discharge to 54 dyne in wetting index. After lamination, the polyethylene laminated side was irradiated by 2 Kc/Kg of an electron beam.

COMPARATIVE EXAMPLE 5

The laminate was obtained by the same conditions as in Example 6, except that the employed polyethylene film was not oxidized by corona discharge. Furthermore, after lamination, irradiation by an electron beam was not carried out on the polyethylene laminated side.

EXAMPLE 8

An aluminum strip (JIS 3004) having a thickness of 0.23 mm and a width of 250 mm was cathodically degreased in a solution of 30 g/l sodium carbonate. After rinsing with water, the aluminum strip was covered with a single layer of hydrated chromium oxide of 10 mg/m$^2$ as chromium by a cathodically treatment in a solution of 30 g/l sodium dichromate under a cathodic current density of 30 A/dm$^2$ at a solution temperature of 45° C. After rinsing with water and drying, both sides of the aluminum was laminated with the same polyethylene film as in Example 1 wherein 5 Kc/Kg of an electron beam had been irradiated.

COMPARATIVE EXAMPLE 6

The same aluminum strip as in Example 8 which was not treated by sodium dichromate solution was laminated with the same polyethylene film as in Example After lamination, the irradiation of an electron beam was not carried out.

The characteristics of the polyethylene laminated metal sheet were evaluated by the following testing methods, after the measurement of the coating weight on the resultant metal sheet by an X-ray fluorescent method. The results are shown in Table 1 and Table 2.

(1) Adhesion of the Laminated Polyethylene After Forming to a Drawn Cup

The resultant metal sheet was cut to a circular blank having a diameter of 80 mm by a punch press. The blank was deeply drawn to form a cup in which the polyethylene laminated side is an outside of cup at a drawing ratio of 2.0. The adhesion of the laminated polyethylene to the metal sheet was evaluated by the degree of the peeling off of the polyethylene from the formed cup body and then divided into 5 ranks, wherein 5 was excellent, 4 was good, 3 was fair, 2 was poor and 1 was bad.

(2) Resistance to Hot Steam and Hot Water

The cup obtained by the method of (1) was treated by hot steam having a temperature of 120° C. for 30 minutes in a retort. After that, the adhesion of the laminated polyethylene to the metal sheet was evaluated by the degree of the peeling off of the laminated polyethylene in the formed cup body and then divided into 5 ranks by the same method of (1).

Furthermore, the degrees of the discoloration and the uniformity in the surface of the polyethylene laminated side of the sample were evaluated with naked eye and then divided into 5 ranks, wherein 5 was excellent (uniform and no discoloration), 4 was good, 3 was fair, 2 was poor and 1 was bad (remarkably milky or partially melted).

The foregoing is exemplary and not intended to limit the scope of the claims which follow.

TABLE 1

|  | Ex. 1 | Ex. 2 | Ex. 3 | Ex. 4 | Ex. 5 | Comp. Ex. 1 | Comp. Ex. 2 |
|---|---|---|---|---|---|---|---|
| Base metal sheet | TFS | TFS | TFS | TFS | TFS | TFS | TFS |
| Amount of Cr$^o$ (mg/m$^2$) | 120 | 105 | 95 | 120 | 120 | 120 | 105 |
| Amount of Cr$^{ox}$ (mg/m$^2$) | 18 | 23 | 7 | 18 | 18 | 18 | 23 |
| Oxidation treatment (wetting index) | No | No | No | No | No | No | No |
| Amount of irradiated radioactive ray to PE film (Kc/kg) | 1.2 after lami. | 23 after lami. | 2.0 after lami. | 5.0 before lami. | 10.0 after lami. | 0 | 0.5 after lami. |
| Properties of samples |  |  |  |  |  |  |  |

TABLE 1-continued

|  | Ex. 1 | Ex. 2 | Ex. 3 | Ex. 4 | Ex. 5 | Comp. Ex. 1 | Comp. Ex. 2 |
|---|---|---|---|---|---|---|---|
| Adhesion of PE film after forming to cup | 5 | 5 | 4 | 5 | 5 | 5 | 5 |
| Adhesion of PE film after retort treat. | 5 | 5 | 4 | 5 | 5 | 4 | 4 |
| Appearance after retort treatment | 5 | 5 | 5 | 5 | 5 | 1 | 2 |

Remarks:
*1 Cr° represents metallic chromium and Cr$^{ox}$ represents Cr in hydrated Cr oxide.
*2 PE represents polyethylene.

TABLE 2

|  | Comp. Ex. 3 | Comp. Ex. 4 | Ex. 6 | Ex. 7 | Comp. Ex. 5 | Ex. 8 | Comp. Ex. 6 |
|---|---|---|---|---|---|---|---|
| Base metal sheet | TFS | TFS | Sn plated steel sheet | | | Al sheet | |
| Amount of Cr° (mg/m$^2$) | 90 | 80 | 95 | 95 | 95 | 0 | 0 |
| Amount of Cr$^{ox}$ (mg/m$^2$) | 28 | 3 | 13 | 13 | 13 | 10 | 0 |
| Oxidation treatment (wetting index) | No | No | Yes (38) | Yes (54) | No | No | No |
| Amount of irradiated radioactive ray to PE film (Kc/kg) | 28.0 after lami. | 10.0 after lami. | 1.2 after lami. | 2.0 before lami. | 0 | 5.0 before lami. | 0 |
| Properties of samples | | | | | | | |
| Adhesion of PE film after forming to cup | 4 | 3 | 4 | 5 | 3 | 5 | 3 |
| Adhesion of PE film after retort treat. | 3 | 3 | 4 | 5 | 3 | 5 | 3 |
| Appearance after retort treatment | 3 | 5 | 5 | 5 | 1 | 5 | 1 |

Remarks:
*1 Cr° represents metallic chromium and Cr$^{ox}$ represents Cr in hydrated Cr oxide.
*2 PE represents polyethylene.

What is claimed is:

1. A method for producing a metal sheet laminated with a polyethylene film comprising
   providing a metal sheet with chromium layer means consisting of one of a single layer consisting of a layer of hydrated chromium oxide and a double layer consisting of a lower layer of metallic chromium and an upper layer of hydrated chromium oxide,
   heating said metal sheet with said chromium layer means thereon to a temperature of Tm to Tm+240° C., where Tm is the melting temperature of the polyethylene film,
   exposing a surface of a polyethylene film having 70 to 100 mole % of ethylene units to an oxidation treatment sufficient to produce a wetting index in the range of 38 to 54 dyne on said surface,
   laminating said surface of said polyethylene film directly to said chromium layer means on at least one side of said metal sheet,
   quenching said metal sheet with said laminated polyethylene film, and
   irradiating said polyethylene film with 1 to 25 kilocoulomb/kilogram of a radioactive ray.

2. The method of claim 1 wherein said polyethylene film is irradiated by said radioactive ray prior to lamination.

3. The method of claim 1 wherein said polyethylene film is irradiated subsequent to lamination and quenching.

4. The method of claim 1 wherein said metal sheet is one of tin plated steel, nickel plated steel, and aluminum.

5. The method of claim 1 wherein said metal sheet is tin plated steel with tin at 0.05 to 5.6 g/m$^2$ of tin.

6. The method of claim 1 wherein said metal sheet is nickel plated steel with 0.05 to 3.0 g/m$^2$ of nickel.

7. The method of claim 1 wherein said layer of hydrated chromium oxide contains 5 to 25 mg/m$^2$ of chromium.

8. The method of claim 1 wherein said layer of metallic chromium contains 10 to 150 g/m$^2$ of chromium.

9. The method of claim 1 wherein said radioactive ray is at least one of an electron beam, a gamma ray, and an X-ray.

10. The method of claim 1 wherein said polyethylene is selected from the group consisting of a low density polyethylene, a medium density polyethylene, a high density polyethylene, a polyethylene modified by an ionomer which is sodium, potassium, zinc, magnesium, calcium or aluminum salt of metacryl acid, acryl acid or maleic acid, a polyethylene modified by maleic acid, acryl acid and polyethylene copolymerized by polypropylene.

11. The method of claim 1 wherein said polyethylene is laminated using a laminating roll having a surface temperature below Tm.

12. The method of claim 1 wherein said oxidation treatment comprises one of a corona discharge treatment, a plasma treatment, and a flame treatment.

13. The method of claim 1 wherein, after laminating said polyethylene film to said chromium layer means, said metal sheet with said polyethylene film is quenched without any additional heating between laminating and quenching.

14. A method for producing a metal sheet having one side laminated with a polyethylene film and another side laminated with a polyester resin film, comprising
   providing a metal sheet with chromium layer means consisting of one of a single layer consisting of a layer of hydrated chromium oxide and a double layer consisting of a lower layer of metallic chromium and an upper layer of hydrated chromium oxide, heating said metal sheet with said chromium layer means thereon to a temperature of T to T+160° C., where T is the melting temperature of the polyester resin film, exposing a surface of a polyethylene film having 70 to 100 mole % of ethylene units to an oxidation treatment sufficient to produce a wetting index in the range of 38 to 54 dyne on said surface, laminating said surface of said polyethylene film directly to said chromium layer means on one side of said metal sheet, simultaneously laminating said polyester resin film to the other side of said metal sheet, quenching said metal sheet with said laminated polyethylene film and said laminated polyester film, and irradiating said polyethylene film with 1 to 25 kilocoulomb/kilogram of a radioactive ray.

15. The method of claim 14 wherein said polyethylene film is irradiated subsequent to limitation and quenching.

16. The method of claim 14 wherein said polyester resin film is laminated on said metal sheet using a laminating roll having a surface temperature below T.

17. The method of claim 14 wherein said polyester resin film is a biaxially oriented polyester resin film.

18. The method of claim 17 wherein said polyester resin film is one of a polyethylene terephthalate film, a polyethylene terephthalate film copolymerized with polyethylene isophthalate, polyethylene adipate or polybutylene terephthalate.

19. The method of claim 14 wherein said polyethylene film is irradiated by a radioactive ray prior to lamination.

20. The method of claim 14 wherein said oxidation treatment comprises one of a corona discharge treatment, a plasma treatment, and a flame treatment.

21. The method of claim 14 wherein, after laminating said polyethylene film and said polyester resin film to said metal sheet, said metal sheet with said film s thereon is quenched without any additional heating between laminating and quenching.

22. The method of claim 14 wherein said metal sheet is nickel plated steel with 0.05 to 3.0 $g/m^2$ of nickel.

23. The method of claim 14 wherein said layer of hydrated chromium oxide contains 5 to 25 $mg/m^2$ of chromium.

24. The method of claim 14 wherein said layer of metallic chromium contains 10 to 150 $g/m^2$ of chromium.

25. The method of claim 14 wherein said radioactive ray is at leas tone of an electron beam, a gamma ray, and an X-ray.

26. The method of claim 14 wherein said polyethylene is selected from the group consisting of a low density polyethylene, a medium density polyethylene, a high density polyethylene, a polyethylene modified by an ionomer which is sodium, potassium, zinc, magnesium, calcium or aluminum slat of metacryl acid, acryl acid or maleic acid, a polyethylene modified by maleic acid, acryl acid and polyethylene copolymerized by polypropylene.

27. The method of claim 14 wherein said polyethylene film is irradiated subsequent to lamination and quenching.

28. The method of claim 14 wherein said metal sheet is one of tin plated, steel, nickel plated steel, and aluminum.

29. The method of claim 14 wherein said metal sheet is tin plated steel with tin at 0.05 to 5.6 $g/m^2$ of tin.

* * * * *

UNITED STATES PATENT AND TRADEMARK OFFICE
CERTIFICATE OF CORRECTION

PATENT NO. : 5,234,516
DATED : August 10, 1993
INVENTOR(S) : Okumura et al.

It is certified that error appears in the above-indentified patent and that said Letters Patent is hereby corrected as shown below:

Col. 8, line 66    "Example After" should be --Example 1. After--; and

Col.10, lines 19-20    "Example After lamination" should be --Example 1. After lamination--.

Signed and Sealed this

Fourteenth Day of February, 1995

Attest:

BRUCE LEHMAN

Attesting Officer     Commissioner of Patents and Trademarks